(No Model.)
F. J. MACHALSKI.
APPARATUS FOR TREATING GARBAGE.
No. 532,799. Patented Jan. 22, 1895.
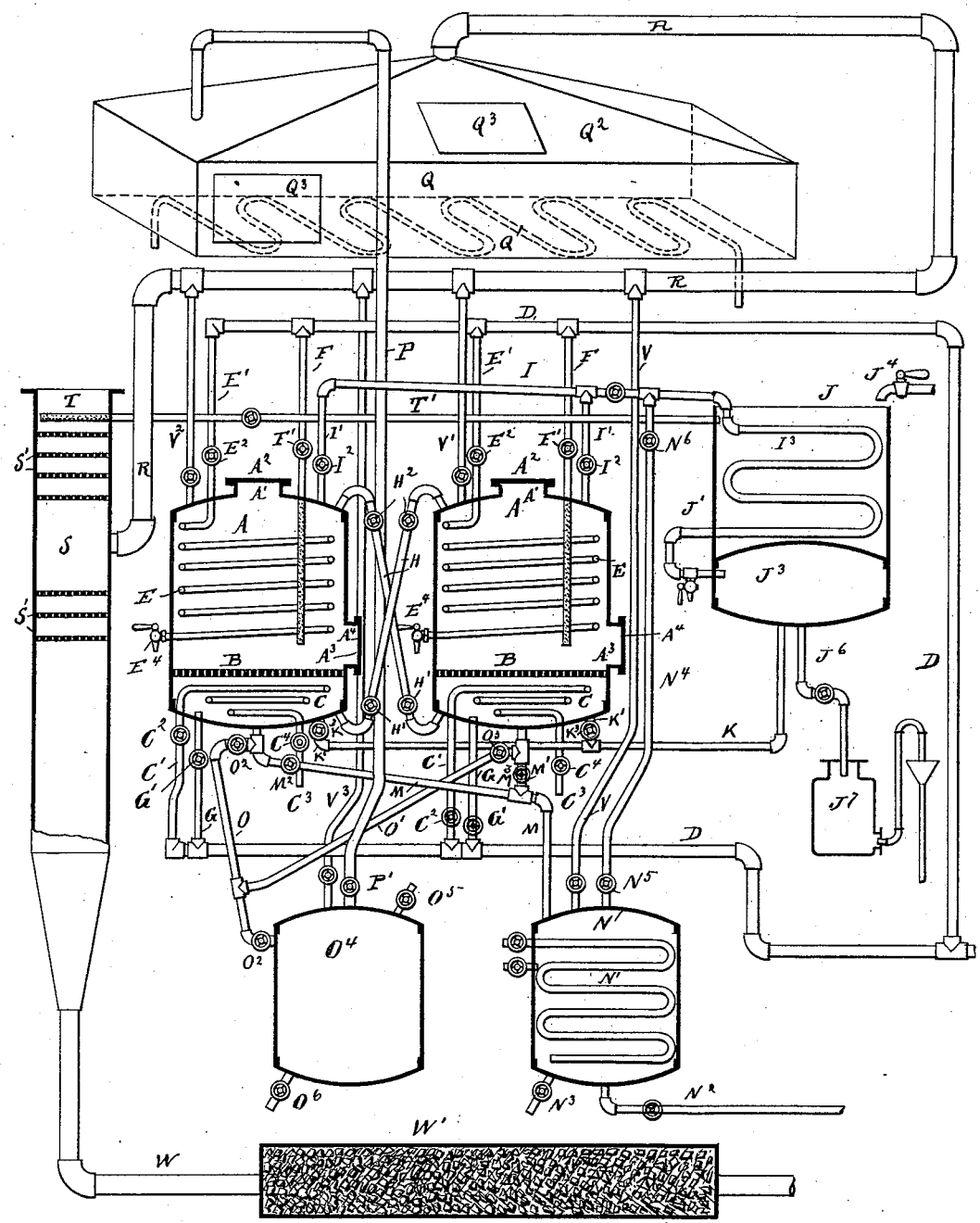

UNITED STATES PATENT OFFICE.

FLORENTINE J. MACHALSKI, OF BROOKLYN, NEW YORK.

APPARATUS FOR TREATING GARBAGE.

SPECIFICATION forming part of Letters Patent No. 532,799, dated January 22, 1895.

Application filed June 12, 1894. Serial No. 514,302. (No model.)

*To all whom it may concern:*

Be it known that I, FLORENTINE J. MACHALSKI, a subject of the Emperor of Austria-Hungary, and a resident of Brooklyn, in the county of Kings and State of New York, have invented certain new and useful Improvements in Apparatus for Treating Garbage, of which the following is a specification.

This invention relates to a new and improved apparatus for treating garbage in such a manner as to extract the greasy substances and convert the remaining matter into fertilizer.

The object of my invention is to provide a new and improved apparatus of this kind by means of which the greasy matter and the matter soluble in water can readily be separated from the body of the garbage and used for various purposes and which apparatus is so constructed that no foul or poisonous gases or vapors can escape into the atmosphere and no liquids can escape that would poison or contaminate the streams into which they are conducted.

The invention relates to an apparatus for carrying out the process of treating garbage, which consists in first extracting the grease from the garbage by means of suitable solvents, evaporating said solvents and collecting and condensing the vapors thereof for the purpose of obtaining the grease alone, then treating the same garbage with steam for the purpose of extracting the other soluble substances, then evaporating the water from said solution and collecting the dry residue.

In the accompanying drawings, forming a part of this specification a vertical sectional view of my improved apparatus for treating garbage is shown.

One or more receptacles A, preferably made of sheet iron, and adapted to hold a large quantity of garbage are each provided at the top with a filling opening A′, closed by a tight fitting cover $A^2$ and at the bottom are each provided at the side with a discharge opening or manhole $A^3$ closed by means of tight fitting cover $A^4$ of any approved construction.

Each receptacle A has a perforated or screen bottom B a short distance above the bottom proper and in the space between the false bottom and the bottom proper, a flat steam coil C is arranged, which is connected by the pipe C′ having the valve $C^2$ with the live steam conducting pipe D. A pipe $C^3$ provided with a cock $C^4$ serves for running the water of condensation out of the coil C.

A tubular coil E is arranged in each receptacle A adjacent to the side walls and above the false bottom B and is also connected by a pipe E′ having a valve $E^2$ with the live steam conducting pipe D. A cock $E^4$ serves for running off the water of condensation from the coil E.

A pipe F projects from the top of the receptacle A down to the perforated false bottom B, and is provided with numerous perforations in that part within the receptacle A. Each pipe F has a valve F′ and is connected at its upper end with the live steam conducting pipe D.

The bottom part of each receptacle A is connected by a pipe G having a valve G′ with the live steam conducting pipe D.

That part of each receptacle A below the false bottom B is connected by a pipe H, having the two cocks H′ and $H^2$ at its ends with the top of the adjacent receptacle A as to permit of working the two receptacles together or singly. A pipe I is connected by branch pipes I′ having valves $I^2$ with the top parts of the receptacles A and leads to a condensing coil $I^3$ in a tank J containing cooling water, which coil is connected by the pipe J′ with the benzine receiver $J^3$. The cooling water flows from the spigot $J^4$ into the tank J. The bottom of the benzine receiver $J^3$ is connected by the pipe K and branch pipes K′ with the bottom parts of the two receptacles A, said branch pipes having the controlling valves $K^3$.

The bottom parts of the receptacles A are connected by the pipes M and M′ having the controlling valves $M^2$ and $M^3$ with the top of the grease receiver N containing the steam coil N′ and provided at the bottom with the outlet pipe $N^2$ and with the blowoff cock $N^3$. A pipe $N^4$ having the controlling valves $N^5$ and $N^6$ leads from the top of the grease receiver N to the pipe I. The pipes M and M′ are connected by the pipes O and O′ having the controlling valves $O^2$ and $O^3$ with the vessel $O^4$ having the vent cock $O^5$ at the top and the blow off cock $O^6$ at the bottom.

The bottom of the benzine receiver J is connected by a pipe J⁶ with a water bottle J⁷ for receiving the water drawn from the benzine.

The vessel O⁴ is connected by a pipe P having the controlling valve P' with an evaporating pan Q containing a flat steam coil Q' and provided with a hood Q² the top of which is in communication with a fume pipe R of sufficient dimensions for carrying off the fumes and vapors. The pan Q is also provided with one or more gates Q³ for removing the contents of the pan.

The fume pipe R leads to absorption tower S provided with a series of perforated horizontal partitions S' above and below the place where the pipe R enters said tower. Above the uppermost plate S' a water spraying device T is arranged and the same preferably is connected by a pipe T' with the water tank J which is so located that the water can flow from the same to the spraying device. The fume pipe R is connected by the pipes V V' V² V³ with the grease receiver N, the receptacles A A and the vessel O⁴ respectively, said pipes having suitable controlling valves. The bottom of the absorption tower S is connected with the conduit W in which is arranged a box W' containing lumps of lime or any other suitable substance, through which the water from the tower is compelled to run for the purpose of neutralizing any injurious matter and preventing the water running off through the conduit W from contaminating any water course into which it may run and also to prevent it from contaminating the surrounding air.

The operation is as follows: The receptacles A are filled to a greater or less extent with garbage of any kind and the covers are all closed tightly. Then a greater or less quantity of solvent such as benzine, gasoline or any other suitable volatile solvent is admitted into the receptacles A from the benzine receiver J³. The contents of the receptacles and the solvent are then heated by means of steam admitted into the coils C and by steam admitted through the pipes G directly into the receptacles. The solvents absorb the grease contained in the garbage and retain the same. After a sufficient time has elapsed to dissolve all the grease which time depends upon the nature of the garbage and the amount and the degree of heat, all which can readily be determined by experience, the valves in the pipes leading to the condensing coil I³ are opened to permit the vapors of the solvents to pass to said condenser where they are condensed and then run into the receiver J³. The grease is then run into the grease receiver N where the remaining particles of the solvent are volatilized by means of steam admitted into the coil N', the vapors passing through the pipes N⁴ and I to the condenser I³. When a sufficient quantity of grease has been collected in the receiver N it is run off to be used in the arts for various purposes. Then steam is admitted into the coils E in the receptacles A and also into the perforated pipes F for the purpose of fully digesting the garbage and dissolving such substances that have not been affected by the solvents used for extracting the grease and when such substances are fully dissolved the solution containing the same is run into the vessel O⁴ and by any suitable means is forced or conducted from the same through the pipe P into the evaporating pan Q where the solution is heated by means of steam admitted into the coil Q' whereby the liquids are evaporated. At suitable intervals the dry mass remaining in the pan is removed and is then used for manufacturing fertilizer that is for enriching other fertilizing substances. The fumes from the evaporating pan pass into the fume duct and with the fumes from the other receptacles, receivers, &c., pass into the absorption tower where they are absorbed by the spray of water and carried through the tower and through the box containing lime or other neutralizing agent.

The entire operation can thus be carried on without being obnoxious or injurious to health or vegetation as all foul odors are conducted into the fume pipe and are thus prevented from escaping into the air.

The treated garbage is then removed from the receptacles A and mixed with other substances to produce fertilizer.

Having thus described my invention, what I claim as new, and desire to secure by Letters Patent, is—

1. The combination with a receptacle for receiving garbage to be treated, of steam coils in the same, means for conducting a solvent for the grease contained in the garbage into said receptacle, a pipe for conducting the vapors of the solvent out of the receptacle, a condenser for condensing said vapors, a grease receiver located below the receptacle, a pipe for conducting the grease from the receptacle to said grease receiver, a vessel for receiving a solution containing those soluble parts in the garbage besides the grease, a pipe for conducting said solution from the receptacle to said vessel, an evaporating pan, a pipe for conducting the solution from said vessel to the evaporating pan, a hood on said pan, a fume pipe connected with said hood, an absorption tower, into which said fume pipe leads, and means for spraying water in said absorption tower, above the inlet of the fume pipe, substantially as herein shown and described.

2. The combination with a receptacle for treating garbage with grease solvents and with steam, of a grease receptacle, for receiving the grease extracted from the garbage in said receptacle, a vessel for receiving the aqueous solution from said garbage, an evaporating pan connected with said vessel, a hood on said pan, a fume pipe connected with said hood and with the treating receptacle, the grease receiver and the vessel for receiving the aqueous solution, an absorption tower into which said fume pipe leads and means for spraying water above the inlet of the fume pipe into the absorption tower, substantially as herein shown and described.

3. The combination with a receptacle for treating garbage, with substances for extracting the grease and other soluble substances from the garbage, a fume pipe connected with said receptacle, an absorption tower into which said fume pipe leads, means for spraying water in said tower, above the inlet of the fume pipe, a series of perforated horizontal partitions in said tower above and below the inlet of the fume pipe, a conduit for conducting the water from the absorption tower and a receptacle for a neutralizing agent arranged in the course of said outlet conduit substantially as herein shown and described.

In testimony that I claim the foregoing as my invention I have signed my name, in presence of two witnesses, this 9th day of June, 1894.

FLORENTINE J. MACHALSKI.

Witnesses:
OSCAR F. GUNZ,
D. PETRI PALMEDY.